United States Patent
Narkis et al.

Patent Number: 5,958,303
Date of Patent: Sep. 28, 1999

[54] ELECTRICALLY CONDUCTIVE COMPOSITIONS AND METHODS FOR PRODUCING SAME

[75] Inventors: Moshe Narkis; Rosa Tchoudakov; Arnon Siegmann; Anita Vaxman, all of Haifa, Israel

[73] Assignee: Carmel Olefins Ltd, Haifa, Israel

[21] Appl. No.: 08/999,798

[22] Filed: Sep. 18, 1997

Related U.S. Application Data

[60] Provisional application No. 60/030,621, Nov. 7, 1996.

[51] Int. Cl.$^6$ ..................................................... H01B 1/24
[52] U.S. Cl. ........................................... 252/511; 264/105
[58] Field of Search ........................... 252/511; 264/105; 423/449.1; 524/495

[56] References Cited

U.S. PATENT DOCUMENTS

| | | | |
|---|---|---|---|
| 4,169,816 | 10/1979 | Tsien ........................................ | 252/511 |
| 5,004,561 | 4/1991 | Nomura et al. ......................... | 252/511 |
| 5,098,610 | 3/1992 | Okamura et al. ....................... | 252/511 |
| 5,179,164 | 1/1993 | Lausberg et al. ....................... | 525/179 |
| 5,248,553 | 9/1993 | Miyashita et al. ....................... | 428/297 |

FOREIGN PATENT DOCUMENTS 1643568  4/1991  U.S.S.R. .

OTHER PUBLICATIONS

Miyasaka, Keizo et al. Electrical Conductivity of Carbon–Polymer Composites as a Function of Carbon Content, 1982, Journal of Materials Science 17, pp. 1510–1616.

F. Carmona, The Electrical Properties of Carbon Black Filled Polymers, 27–30 Sep. 1993, The Second International Conference on a Carbon Black, pp. 213–222.

*Primary Examiner*—Mark Kopec
*Attorney, Agent, or Firm*—Darby & Darby

[57] ABSTRACT

An electrically conductive composition and a method for producing same, for example by injection molding. The composition includes a matrix comprising substantially a first thermoplastic component, a second thermoplastic component having a higher polarity than that of the first thermoplastic component, the second component encapsulating a plurality of fibers forming a network of encapsulated fibers within the matrix, and a carbon component preferentially attracted to the second component so as to make said network an electrically conductive network within the matrix.

36 Claims, 5 Drawing Sheets

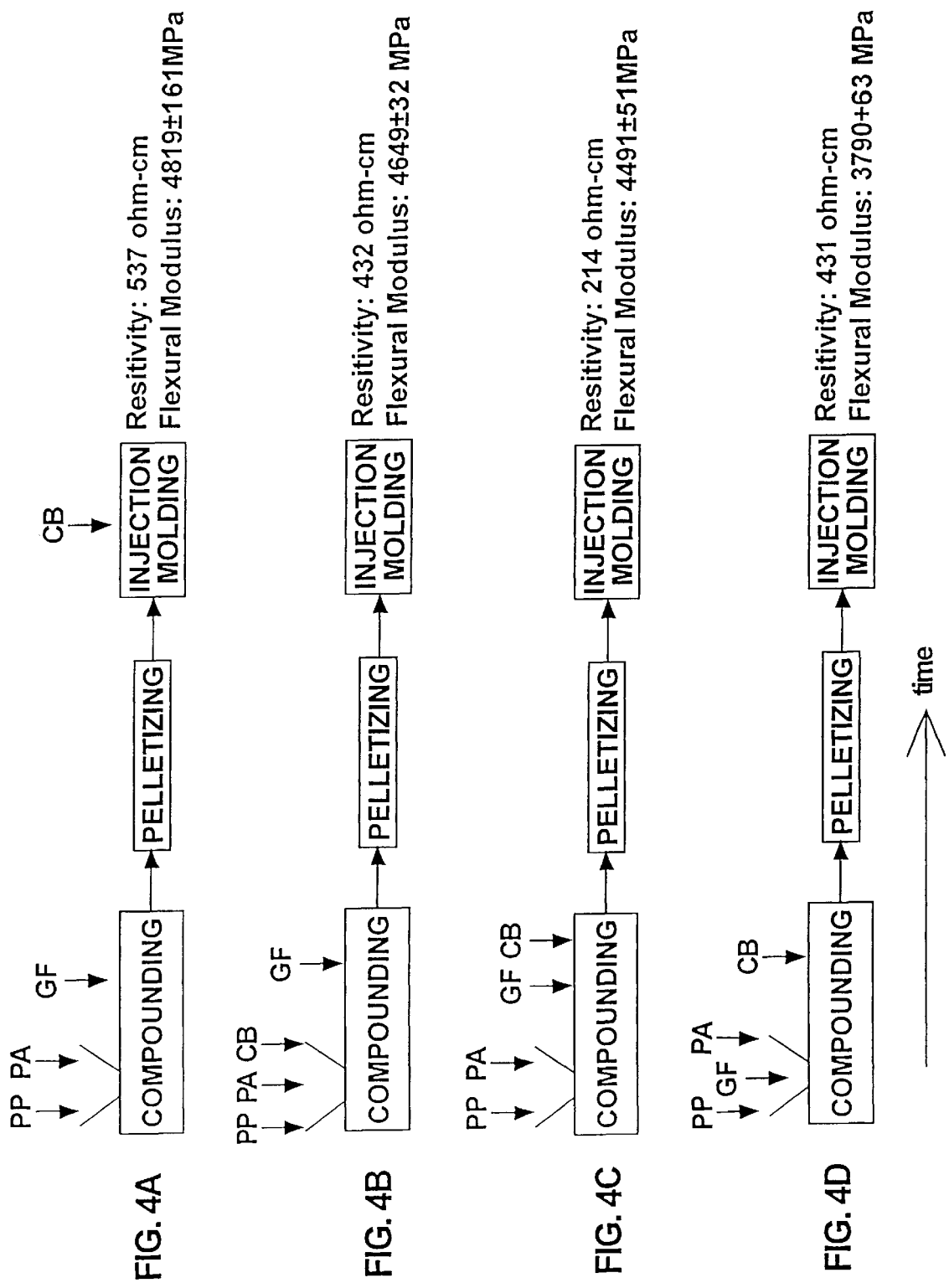

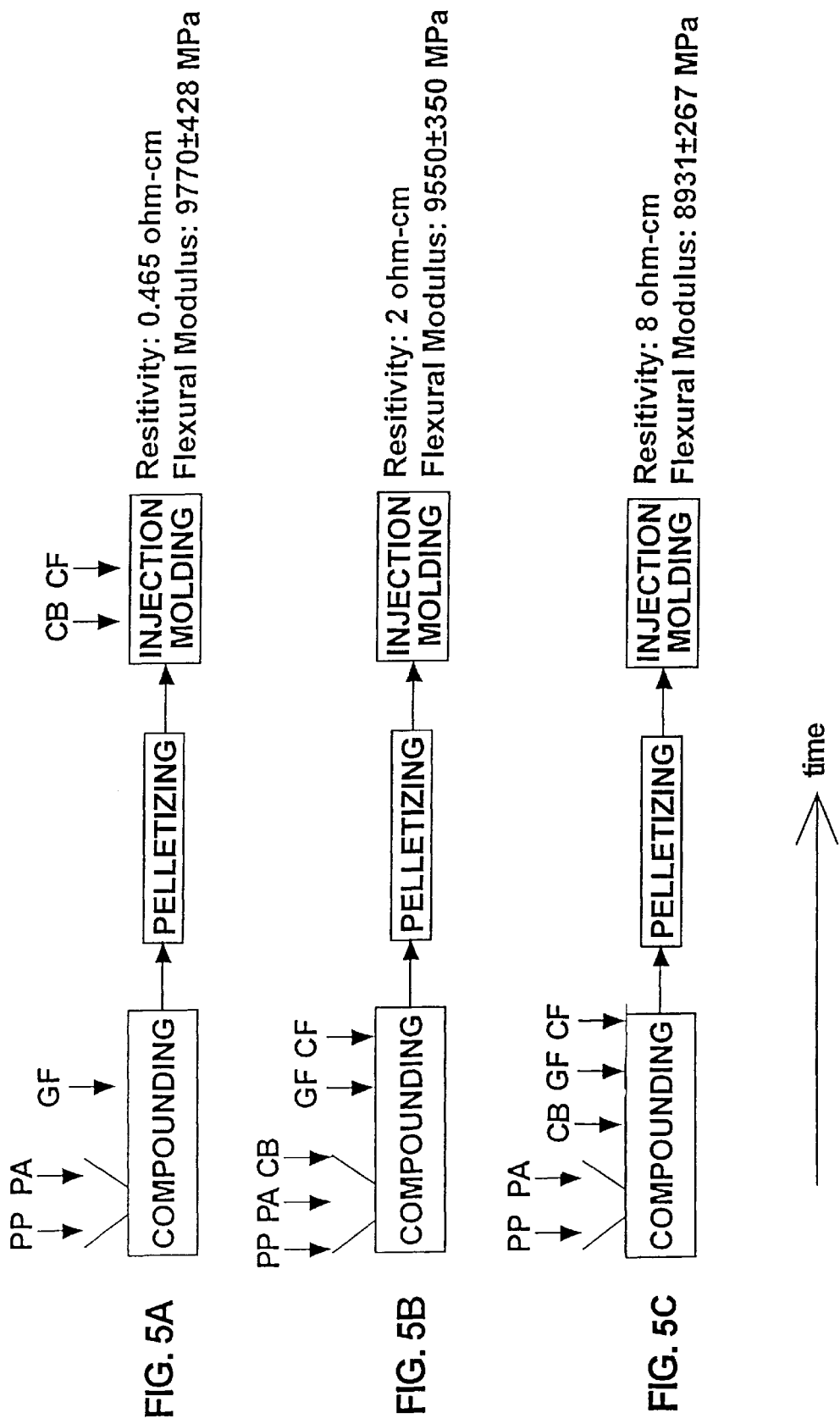

ns and plastic boxes for shielding electronic components from electromagnetic interference (EMI). Examples for electrostatic discharge (ESD) applications are electronic packaging, clean room installations, storage trays, water carriers, chip carriers and construction components for explosion-proof environments.

ELECTRICALLY CONDUCTIVE COMPOSITIONS AND METHODS FOR PRODUCING SAME

This application claims the benefit of provisional application Serial No. 60/030,621, filed Nov. 7, 1996.

FIELD OF THE INVENTION

The present invention relates to electrically conductive composites based on a mixture of two thermoplastic compounds having different polarity with glass fibers and carbon black and or carbon fibers and to methods for producing same.

BACKGROUND OF THE INVENTION

Electrically conductive polymer based compositions are used in many industrial applications, such as for dissipating electrostatic charge from plastic parts and plastic boxes for shielding electronic components from electromagnetic interference (EMI). Examples for electrostatic discharge (ESD) applications are electronic packaging, clean room installations, storage trays, water carriers, chip carriers and construction components for explosion-proof environments.

Compounds tailored for dissipating static electricity having a typical surface resistivity of $10^2$ to $10^{13}$ ohm/square and compounds specified for EMI shielding applications typically exhibit volume resistivity of $10^{-2}$ to $10^2$ ohm-cm.

There are known in the art polymer based compounds having appropriate resistivity for both static electricity dissipation and EMI shielding. One class of compounds known in the art is based on polypropylene (PP) or polyethylene (PE) with high carbon loading levels up to 40 to 60% by weight characterized by surface resistivity of about $10^3$–$10^8$ ohm/square. For applications requiring EMI shielding, weight loading levels of 30 to 50% PAN carbon fibers, 40% aluminum flakes, 15% nickel-coated carbon fibers or 5 to 10% stainless steel fibers have been used for the same class of polymers.

The method currently used to increase the electrical conductivity of polymers is to fill them with specific conductive additives, such as metallic powders, metallic fibers, carbon black, carbon fibers and recently by intrinsically conductive polymeric powders. The characteristic behavior of these materials is the existence of a strongly non-linear relationship between the electrical conductivity and the filler concentration. At low filler loading, the electrical conductivity of the polymeric compound is generally quite low; its magnitude is similar to that of the polymer matrix ($10^{-16}$ to $10^{-11}$ ohm$^{-1}$ cm$^{-1}$). As loading is increased, the conductivity increases sharply by several orders of magnitude over a narrow concentration range, then slowly increases towards the conductivity of the condensed filler powder of the order of $10^{-4}$ to $10^{-1}$ ohm$^{-1}$ cm$^{-1}$. This behavior describes an insulator-conductor transition occurring at a critical volume fraction (percolation threshold). This threshold is due to the formation of a chain-like network of particles extending throughout the entire specimen volume and allowing electrical current to flow.

U.S. Pat. No. 4,169,816 describes an electrically conductive single thermoplastic material composition with a high carbon content, the composition including for each 100 parts of polypropylene-ethylene copolymer 15–30 parts of carbon black, 0.25 to 1 part of silica and 1–10 parts of a fiber reinforcing agent selected from carbon fibers or a mixture of carbon fibers and glass fibers.

U.S. Pat. No. 5,004,561 describes another single thermoplastic based electrically conductive composition with a high carbon content, the composition including for each 100 parts of thermoplastic resin selected from the group of polyolefin, polystyrene and acrylonitrite/styrene/butadiene (ABS) copolymer resin, polybutylene terephthalate (PBT) resin, polyphenylene ether and polyamide (PA) resin, 30–300 parts of electrically conductive glass fibers, 5–40 parts of carbon black and 5–40 parts of graphite.

Russian Patent No. SU 1,643,568 describes a high carbon based electrical conductive thermoplastic composition in which electrical conductivity is achieved from the dispersion of carbon in the matrix. The composition includes 20–35 weight percent polypropylene, 10–20 weight percent polyamide, 20–30 weight percent carbon black, 10–20 weight percent graphite and 15–20 percent glass fibers.

There are generally two methods for producing electrically conductive thermoplastic articles known in the art. In the slow production rate compression molding method less filler (e.g. carbon black) is required to achieve a desired conductivity, however the mechanical properties of the composition are usually deficient. In the fast production rate injection molding method better mechanical properties are achieved and articles having complex geometry can be produced but the amount of conductive filler required is high. One deficiency of compression molding of electrically conductive compounds is that the relatively slow processing is expensive.

A major disadvantage of prior art polymer based compounds for electrostatic dissipation and EMI shielding applications is the high percentage of conductive additives required to form the conductive polymer compounds resulting in high cost and deficient processability and mechanical properties and also high carbon contamination which is adverse in particular for clean room applications.

SUMMARY OF THE INVENTION

The present invention provides an improved thermoplastic electrically conductive composition.

According to an aspect of the present invention, the electrically conductive composition includes a first thermoplastic component forming a continuous matrix and a second thermoplastic component having a polarity larger than the polarity of the matrix. The composition also includes fibers being encapsulated in-situ by the second thermoplastic component and forming a network within the matrix and also a carbon black component which is preferentially attracted to the second component due to its higher polarity. The in-situ formation of an encapsulated network, including carbon black, in preferred locations of particles provides an electrically conductive composition.

According to a further aspect of the present invention, the ratio between the conductive carbon filler and the second component is sufficiently high so that a substantial part of the carbon filler is located at the interface between the second component and the matrix to provide the electrical conductivity. Nevertheless, the overall concentration of carbon is at least an order of magnitude smaller than in the prior art electrically conductive compositions, thus making the compositions of the present invention advantageous in many applications including clean room applications.

Another object of the present invention is to utilize a fast processing method for producing the thermoplastic electrically conductive compositions of the present invention. Injection molding is used for producing the electrically conductive thermoplastic compositions of the recent inventions while using very low carbon black concentrations and improving the mechanical properties of the composition.

The electrically conductive composition of the present invention includes a matrix including substantially a first thermoplastic component, a second thermoplastic component having a higher polarity than that of the first thermoplastic component, the second component encapsulating a plurality of fibers forming a network of encapsulated fibers within the matrix, and a carbon component preferentially attracted to the second component so as to make the network an electrically conductive network within the matrix.

In one embodiment of the present invention, the first thermoplastic component is a polyolefin compound with or without an added elastomer component. The polyolefin is selected from the group of polypropylene which may be a homopolymer or a copolymer and polyethylene. The second component is polyamide or EVOH. In a preferred embodiment, the composition includes less than 20 parts per hundred polyamide or EVOH.

In another embodiment, the first component is acrylonitrite/butadiene/styrene and the second component is polyamide, or EVOH.

In yet another embodiment, the first component is selected from polystyrene, high impact polystyrene and polyphenyleneoxide/polystyrene and the second component is polyamide or EVOH.

The fibers of the compositions of the present invention may be glass fibers. In a preferred embodiment, the composition includes less than 55 parts per hundred glass fibers.

The carbon component of the compositions of the invention of the present invention may be carbon black. Alternatively, or in combination, the carbon component may be carbon fibers. In a preferred embodiment, the composition includes less than 10 parts per hundred carbon black. In another preferred embodiment, the composition includes less than 30 parts per hundred carbon fibers.

In a preferred embodiment, the composition has one or more of a volume resistivity from about 0.1 to about $10^9$ ohm-cm, a flexural modulus of up to about 11,000 MPa, and a tensile strength of up to 60 MPa.

BRIEF DESCRIPTION OF THE DRAWINGS

The present invention will be understood and appreciated more fully from the following detailed description taken in conjunction with the appended drawings in which:

FIGS. 4A–4D are schematic block diagram illustrations of four alternative preferred methods for producing the electrically conductive thermoplastic compositions of the present invention wherein carbon black is the carbon compound; and FIGS. 5A–5C are schematic block diagram illustrations of three alternative preferred methods for producing the electrically conductive thermoplastic compositions of the present invention wherein the carbon compound is both carbon black and carbon fibers.

DETAILED DESCRIPTION OF THE PRESENT INVENTION

Figure 1:
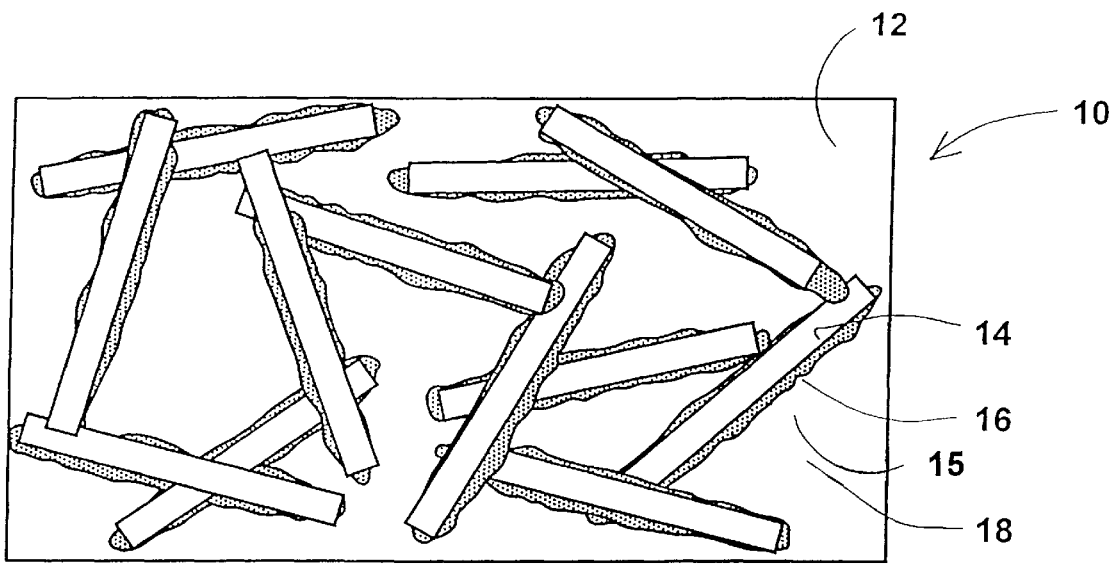
FIG. 1 is a schematic illustration of the morphology of the electrically conductive thermoplastic compositions of the present invention.

Reference is now made to FIG. 1. FIG. 1 is a schematic illustration of the electrically conductive multi-component thermoplastic compositions of the present invention.

The electrically conductive multi-component thermoplastic composition, generally referenced 10, includes a matrix 12 formed substantially of a first thermoplastic compound, glass fibers 14 encapsulated with a second thermoplastic compound 16 having therein and thereon carbon black shown in the SEM micrographs of FIG. 2. As illustrated in FIG. 1, glass fibers 14 encapsulated with second thermoplastic composition 16 with carbon black thereon form a conductive network within polypropylene matrix 12.

In the preferred embodiments, the first thermoplastic component is a polyolefin based component, polystyrene (PS) based component or acrylonitrile/styrene/butadiene (ABS) terpolymer based compound, with or without an added elastomer component and the second thermoplastic component is polyamide (PA) or Polyethylene Vinyl Alcohol (EVOH) copolymer. Preferably, the elastomer component is a combination of elastomers. The addition of the elastomer component to the compound changes the composition's mechanical properties without significantly affecting its electrical conductivity.

Since the affinity of polyamide or EVOH 16 to glass fibers 14 is much stronger than to any of the first thermoplastic components, during the melt blending of composition 10, the second thermoplastic component) preferentially encapsulates, in situ, glass fibers 14 as described in detail with reference to FIG. 3 hereinbelow, thereby producing a network of encapuslated fibers within matrix 12. Moreover, carbon black particles are preferentially attracted to the second thermoplastic component phase and located at the second thermoplastic component (polyamide or EVOH) matrix interfaces as indicated by reference numeral 15, thereby making the network of encapsulated fibers electrically conductive using a much smaller content of carbon black than in the prior art and improving the mechanical properties of composition 10 as described hereinbelow.

Figure 2A:
FIGS. 2A–2C are nonlimiting exemplary SEM micrographs (at different magnifications) of freeze fractured surfaces of an injection molded composition of the present invention.
Figure 2B:
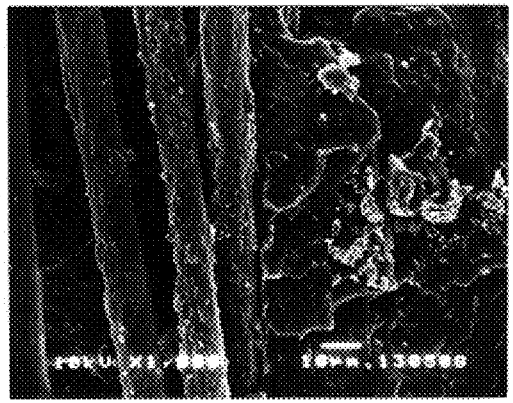
Figure 2C:
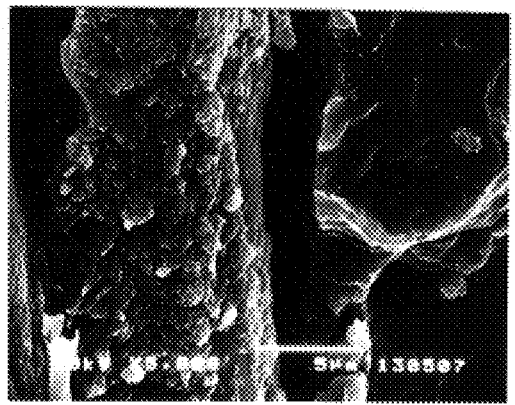

Referring to the three Scanning Electron Microscope (SEM) micrographs of FIGS. 2A–2C which differ in their magnification, the network of encapsulated fibers and the preferential distribution of carbon black 18 in the second thermoplastic component phase 16 is clearly seen.

A particular feature of the present invention is that composition 10 includes much lower concentrations of carbon black than in the prior art for similar levels of electrical conductivities. This is since the electrically conductive carbon black particles form continuous pathways along the interfaces between the second thermoplastic component phase and the matrix (first level of percolation). Moreover, the embedded part of carbon black particles is located within the amorphous phase of the second thermoplastic 16 (second level of percolation), thereby the formation of the conductive pathways is facilitated. This is further facilitated by the network formed of second thermoplastic component encapsulated glass fibers (third level of percolation).

Figure 3:
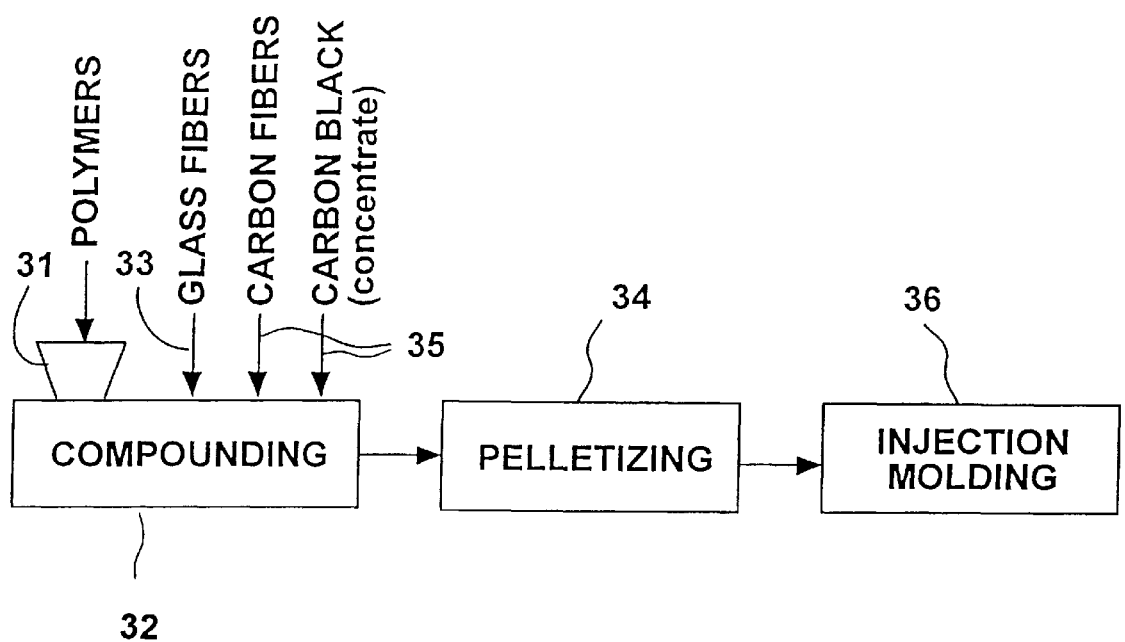
FIG. 3 is a schematic block diagram illustration of a method for producing the electrically conductive thermoplastic compositions of the present invention.

Reference is now made to FIGS. 3 through 5C which illustrate preferred methods for producing the electrically conductive thermoplastic compositions of the present invention. FIG. 3 illustrates the method in general and FIGS. 4A–4D and FIGS. 5A–5C illustrate, respectively, alternatives of the method for two nonlimiting exemplary compositions.

The method of FIG. 3 illustrated in a time sequence from left to right comprising the steps of compounding 32, the step of pelletizing 34 and the step of injection molding 36. In one preferred embodiment the step of compounding 32 includes the steps of dry blending of polypropylene with second thermoplastic component indicated by reference numeral 31 followed by melting and melt mixing with the glass fibers as indicated by 33 and subsequent melt mixing with carbon fibers, carbon black or both.

In the non limiting examples described below, the compounding step 32 is conducted on a twin-screw compounder (Berstorf, Germany), at processing temperatures in the range of 200–285° C. (corresponding to the melting point of the polymer components) and a screw speed of 55 rpm. The resulting compounds are pelletized (step 34) and then injection molded (step 36) at 200–285° C. on a Battenfeld injection molding machine equipped with a three cavity American Standard Testing Material (ASTM) mold (tensile bar, flexural bar and falling dart impact disc).

FIGS. 4A–4D illustrate four preferred alternatives of the method for producing composition 10 whereas the composition includes carbon black as the carbon compound. FIGS. 4A–4D are illustrated for the nonlimiting example of a composition 10 comprises 100 parts by weight polypropylene, 12 parts by weight polyamide, 30 parts by weight glass fibers, and 2 parts by weight carbon black.

In the embodiment illustrated in FIG. 4A, carbon black concentrate is added in the injection molding stage as indicated by reference numeral 37 rather than in the compounding step 32 resulting in a resistivity of 537 Ohm-cm and flexural modulus of 4819±161 MPa.

FIG. 4B illustrates the alternative wherein the carbon black concentrate is dry blended with the polypropylene and polyamide resulting in a resistivity of 432 Ohm-cm and flexural modulus of 4649±32 MPa. FIG. 4C illustrates the alternative wherein the carbon black concentrate is added during compounding resulting in a resistivity of 214 Ohm-cm and flexural modulus of 4491±51 MPa.

In the embodiment of FIG. 4D glass fibers are dry blended with the polypropylene and polyamide while carbon black concentrate is added during compounding resulting in a resistivity of 431 Ohm-cm and flexural modulus of 3790±63 MPa.

FIGS. 5A–5C illustrate three preferred alternatives of the method for producing composition 10 whereas the composition carbon fibers or carbon black and carbon fibers as the carbon compound. FIGS. 5A–5C are illustrated for the nonlimiting example of a composition 10 comprises 100 parts by weight polypropylene, 12 parts by polyamide , 30 parts by weight glass fibers, and 2 parts by weight carbon black and 20 parts by weight carbon fibers.

In the alternative of FIG. 5A both carbon black and carbon fibers are added during the injection molding step resulting in high conductivity (Resistivity of 0.465 Ohm-cm) and high flexural modulus (9770±428 MPa).

In the alternative of FIG. 5B carbon black is dry blended with the polyolefin and polyamide as indicated by step 39 instead of the dry blending indicated by step 31 of the other alternatives while carbon fibers are added (step 35) during compounding resulting in a resistivity of 2 Ohm-cm and flexural modulus of 9550±350 MPa.

In the alternative of FIG. 5C, carbon fibers are added in the compounding stage resulting in resistivity of 8 Ohm-cm illustrates and flexural modulus of 8931±267 MPa.

It will be appreciated that the specific method used to prepare the compounds forming composition 10 for injection molding can be selected from the non limiting embodiments described hereinabove and from many other variations thereof, thereby varying the specific electrical conductivity and mechanical properties (illustrated by the flexural modulus above) of composition 10. In all methods, the present invention provides an electrically conductive thermoplastic composition which provides high electrical conductivity and strong mechanical properties after injection molding.

The following examples illustrate without limitation certain aspects of the present invention.

In all examples, injection molded composite samples (12.6 cm×1.27 cm×0.32 cm) were characterized for electrical properties by measuring volume resistivity, according to ASTM D 257-93 and ASTM D 4496-87, using Keithley instruments. Silver paint was used to eliminate the contact resistance between samples and electrodes.

The corresponding ASTM test methods were used for the mechanical properties evaluation. Specifically, ASTM D 0638 was used for measuring tensile properties, ASTM D 790 was used for measuring flexure, ASTM D 256 was used to measure IZOD impact and ASTM D 570 was used to measure water absorption.

The glass fiber content and the carbon black content in each specimen was determined by using ASTM D 5630-94 and ASTM D 1603-94, respectively.

The composites morphology was studied using JEOL 5400 scanning electron microscope. Freeze fractured surfaces were studied.

In the experiments, commercial grades of PP (homopolymer and copolymer), ABS, PS, HIPS, NORYL (described in detail with reference to Tables 10–13), PE (high and low density grades), elastomer, PA (PA6, PA66, PA 11, PA12, PA 6/6.9, PA 6/12), EVOH, glass fibers (chopped strands, 3.2–6.3 mm length, 10–13 micrometer diameter), conductive carbon black and carbon fibers (chopped fibers, 6 mm length, 7–8 microns diameter) have been used in this study. Five types of carbon black were studied. Their properties are shown in Table 1 below.

TABLE 1

| Property | Ketjen EC 300J (AKZO) | Ketjen EC 600JD (AKZO) | Vulcan XC-72 (Cabot) | Corax L6 (Degussa) | Conductex 975 (Columbian Chemicals) |
| --- | --- | --- | --- | --- | --- |
| Surface area BET, $m^2/g$ | 1000 | | 180 | 265 | 250 |
| Particle size, nm | 30 | | 29 | 18 | 22 |
| Porevolume DBP, ml/100 g | 350 | 480 | 178 | 123 | 165 |
| Surface area CTAB, $m^2/g$ | 480 | | 86 | 150 | 153 |
| Iodine absorption, mg/g | 900 | 1000 | | 293 | 260 |
| Volatilities, % | 0.5 | 0.6 | 1.0 | 1.5 | 1.0 |
| pH | 8 | 8 | 7 | 7.5 | 7 |

All blend ratios described relate to parts by weight, in each case based on 100 parts by weight of the first compound. An electrically conductive polyolefin composites comprise: 100 parts by weight polymer matrix, 4 to 20 parts by Polyamide, 10 to 55 parts by weight glass fibers, 0.5 to 10 parts by weight carbon black, 0 to 30 parts by weight carbon fibers.

The electrical and mechanical behavior of compositions 10 was studied for different polyamide mixtures ratios as a function of glass fiber concentration, polyamide/glass fiber ratio and carbon black concentration. The resistivity and the mechanical properties as a function of composition are summarized in Tables 2A and 2B. It will be appreciated that the samples produced were in accordance with the processing method of the present invention i.e., injection molding.

TABLE 2A

| Compostion | 1 | 2 | 3 | 4 | 5 | 6 | 7 | 8 | 9 | 10 |
|---|---|---|---|---|---|---|---|---|---|---|
| Polypropylene (MFI 12) | 100 | 100 | 100 | 100 | 100 | 100 | 100 | 100 | 100 | 100 |
| Polyamide 6 | 5 | 5 | 5 | 5 | 5 | 8 | 8 | 10 | 12 | 10 |
| Glass Fiber (Vetro tex) | 12 | 12 | 20 | 20 | 20 | 20 | 30 | 30 | 30 | 30 |
| Carbon Black (EC 600) | 1 | 3 | 0.5 | 1 | 3 | 3 | 1 | 1.5 | 2 | 3 |
| Property |  |  |  |  |  |  |  |  |  |  |
| Flexural Modulus, MPa | 3044 | 3849 | 3041 | 3945 | 4104 | 4366 | 5003 | 4655 | 4941 | 5153 |
| Izod Impact, notched, J/m | 69 | 64 | 33 | 83 | 60 | 57 | 76 | 75 | 79 | 65 |
| Volume Resistivity ohm-cm | $>10^8$ | $3.3 \times 10^5$ | $10^8$ | $10^4$ | $1.6 \times 10^5$ | $8.6 \times 10^3$ | $6.6 \times 10^3$ | $3 \times 10^3$ | $1.4 \times 10^3$ | $6.5 \times 10^3$ |

TABLE 2B

| Composition | 1 | 2 | 3 | 4 | 5 | 6 | 7 |
|---|---|---|---|---|---|---|---|
| Polypropylene (MFI 25) | 100 | 100 | 100 | 100 | 100 | 100 | 100 |
| Polyamide 6 | 4 | 5.3 | 6.6 | 8 | 8 | 8 | 12 |
| Glass fiber (Vetrotex) | 20 | 20 | 20 | 20 | 20 | 30 | 30 |
| Carbon black (EC 600) | 0.67 | 088 | 1.1 | 1.5 | 2 | 1.3 | 2 |
| Property |  |  |  |  |  |  |  |
| Specific Gravity, Kg/dm³ | 1.02 | 1.01 | 1.02 | 1.02 | 1.02 | 1.06 | 1.06 |
| Water Absorption, % | 0.04 | 0.06 | 0.06 | 0.04 | 0.05 | 0.08 | 0.08 |
| Flexural Modulus, MPa | 3984 | 3958 | 3954 | 3941 | 3936 | 4866 | 5039 |
| Tensile Strength, MPa | 54 | 58 | 52 | 52 | 58 | 63 | 63 |
| Elongation at Break, % | 2.8 | 3.1 | 2.7 | 2.8 | 2.8 | 2.5 | 2.6 |
| Izod Impact, notched, J/m | 68 | 85 | 66 | 63 | 71 | 85 | 76 |
| Melt Flow Rate, 230° C., 2.16 Kg | 5.2 | 4 | 6 | 2.8 | 3 | 3.3 | 3.2 |
| Heat Distortion Temp, ° C. | 161 | 163 | 161 | 162 | 163 | 164 | 163 |
| Volume Resistivity, ohm-cm | $3.24 \times 10^5$ | $2.5 \times 10^3$ | $3.2 \times 10^4$ | $1.3 \times 10^3$ | $7.9 \times 10^3$ | $3.4 \times 10^3$ | $1.2 \times 10^3$ |

Tables 3A and 3B illustrate the dependence of resistivity and physical properties on glass fiber concentration in compositions 10 for different polypropylene/ polyamide mixtures. The increase of tensile strength, modulus and flexural modulus with increasing glass fiber content is clearly appreciated.

TABLE 3A

| Composition | 1 | 2 | 3 | 4 | 5 |
|---|---|---|---|---|---|
| Polypropylene (MFI 12) | 100 | 100 | 100 | 100 | 100 |
| Polyamide 66 | 5 | 8 | 12 | 16 | 16.5 |
| Glass fiber (Vetrotex) | 2 | 20 | 30 | 40 | 50 |
| Carbon black (EC600) | 1 | 1.5 | 2 | 2.8 | 2.8 |
| Property |  |  |  |  |  |
| Tensile Strength, MPa | 39.4 | 44 | 56.2 | 58 | 47.4 |
| Elongation at break, % | 3.2 | 2.6 | 2.3 | 2.1 | 2 |
| Tensile Modulus, MPa | 1771 | 2030 | 2634 | 3133 | 2406 |

TABLE 3A-continued

| Composition | 1 | 2 | 3 | 4 | 5 |
|---|---|---|---|---|---|
| Flexural Modulus, MPa | 3054 | 3801 | 4684 | 5394 | 5576 |
| Izod Impact, notched, J/m | 64 | 69 | 77 | 71 | 57 |
| Water Absorption, % | 0.02 | 0.03 | 0.04 | 0.06 | 0.07 |
| Specific Gravity, kg/dm³ | 0.981 | 1.025 | 1.082 | 1.122 | 1.145 |
| Volume Resistivity, ohm-cm | $>10^8$ | $9.4 \times 10^4$ | 850 | 440 | $2.3 \times 10^4$ |

TABLE 3B

| Composition | 1 | 2 | 3 | 4 | 5 | 6 | 7 | 8 | 9 |
|---|---|---|---|---|---|---|---|---|---|
| Polypropylene (MF125) | 100 | 100 | 100 | 100 | 100 | 100 | 100 | 100 | 100 |
| Polyamide 66 | 4 | 5.3 | 6.6 | 8 | 8 | 6 | 8 | 10 | 12 |
| Glass fiber (Vetrotex) | 20 | 20 | 20 | 20 | 20 | 30 | 30 | 30 | 30 |
| Carbon black (EC 600) | 0.67 | 0.88 | 1.1 | 1.5 | 2 | 1 | 1.3 | 1.6 | 2 |
| Property | | | | | | | | | |
| Specific Gravity, Kg/dm$^3$ | 1.02 | 1.00 | 1.01 | 1.04 | 1.02 | 1.05 | 1.06 | 1.05 | 1.06 |
| Water Absorption, % | 0.04 | 0.04 | 0.07 | 0.04 | 0.05 | 0.05 | 0.07 | 0.1 | 0.05 |
| Flexural Modulus, MPa | 3917 | 3804 | 3858 | 3731 | 3936 | 4815 | 4640 | 4732 | 4856 |
| Tensile Strength, MPa | 52 | 53 | 53 | 53 | 56 | 57 | 59 | 57 | 61 |
| Elongation at Break, % | 2.7 | 3.1 | 3.0 | 3.0 | 3.0 | 2.6 | 2.4 | 2.9 | 2.0 |
| Izod Impact, notched, J/m | 64 | 71 | 76 | 66 | 67 | 75 | 75 | 77 | 62 |
| Melt Flow Rate, 275° C., 2.16 Kg | 18 | 12 | 11 | 8.6 | 11 | 8 | 8.8 | 8 | 6 |
| Heat Distortion Temp, ° C. | 161 | 163 | 163 | 162 | 162 | 164 | 165 | 165 | 163 |
| Volume Resistivity, ohm-cm | $2 \times 10^4$ | $9.9 \times 10^3$ | $4 \times 10^3$ | 490 | $7.9 \times 10^3$ | 650 | 814 | 241 | 175 |

Table 4 illustrates the dependency of electrical resistivity of PP/PA/GF/CB systems (100/12/30/4 phr ratio respectively) on the type of second thermoplastic component (polyamide) used. It is clearly seen that any type of polyamide can be used for composition 10 and that their electrical conductivity can be determined by selecting the degree of crystalinity of the polyamide. Lower values of resistivity were obtained for compositions 10 based on PA 66 and PA 6, PA11, PA 12 (semicrystalline polyamide) than for those based on PA 6/6-9 and PA 6-12 (amorphous polyamide). Given the same concentration of conductive additive, a higher level of conductivity was achieved in PA 66 (the most crystalline polyamide studied) based compound.

TABLE 4

| Property | PA 66 | PA 6 | PA12 | PA11 | PA 6-6/9 | PA 6-12 |
|---|---|---|---|---|---|---|
| Tensile Strength, MPa | 58.4 | 54.2 | 51.9 | 49.6 | 58.5 | 56.6 |
| Elongationat break, % | 2.1 | 1.9 | 2 | 3 | 2.3 | 1.9 |

TABLE 4-continued

| Property | PA 66 | PA 6 | PA12 | PA11 | PA 6-6/9 | PA 6-12 |
|---|---|---|---|---|---|---|
| Tensile Modulus, MPa | 3256 | 3030 | 2541 | 1868 | 3074 | 3160 |
| Flexural Modulus, MPa | 4850 | 4699 | 4592 | 3899 | 4650 | 4890 |
| Izod Impact, notched, J/m | 72 | 70 | 68.8 | 58.9 | 61 | 62 |
| Specific gravity, kg/dm$^3$ | 1.086 | 1.092 | 1.081 | 1.079 | 1.076 | 1.069 |
| Volume Resistivity, ohm-cm | 700 | $3.3 \times 10^3$ | $2.3 \times 10^3$ | $5.4 \times 10^3$ | $3.3 \times 10^5$ | $1.3 \times 10^5$ |

It will also be appreciated that any type of carbon black can be used with compositions 10. Resistivity and mechanical properties of composites with five CB grades, at two loading levels, for composites based on Polypropylene (100 parts), PA 66 (12 parts) and glass fibers (30 parts) are presented in Table 5. Inspection of this table reveals that Ketjenblacks EC 300 and EC 600, the most conductive carbon blacks used provide the highest electrical conductivity.

TABLE 5

| | EC600 | EC 300 | | XC 72 | | CORAX L6 | | CONDU CTEX | |
|---|---|---|---|---|---|---|---|---|---|
| Property | 2 phr | 2 phr | 4 phr | 2 phr | 4 phr | 2 phr | 4 phr | 2 phr | 4 phr |
| Tensile Strength, MPa | 56.2 | 52.1 | 57.7 | 45.9 | 54 | 44.2 | 45.1 | 43.9 | 58.4 |
| Elongation at break, % | 2.1 | 2.5 | 2.3 | 2.6 | 2.3 | 2.6 | 2.2 | 3.1 | 2.1 |
| Tensile Modulus, MPa | 3133 | 2776 | 2911 | 2087 | 2933 | 2291 | 2147 | 2193 | 3194 |
| Flexural Modulus, MPa | 4684 | 4898 | 4803 | 4968 | 4747 | 5108 | 4335 | 4948 | 4638 |
| Izod Impact, notched, J/m | 77 | — | 72 | 70 | 68 | 74 | 66 | 79 | 72 |
| Specific gravity, kg/dm$^3$ | 1.082 | 1.072 | 1.079 | 1.079 | 1.079 | 1.074 | 1.076 | 1.069 | 1.074 |
| Volume Resistivity, ohm-cm | 850 | 1560 | 789 | >$10^8$ | 4110 | >$10^8$ | 852 | >$10^8$ | $4 \times 10^4$ |

Yet another factor which determines the resistivity and mechanical properties of compositions 10 is the flowability (MFI) of the polymer matrix used. As clearly seen from Table 6 below, significant lower resistivities are obtained using for example polypropylene with higher MFI. Table 6 is provided below.

TABLE 6

| Composition | 1 | 2 | 3 | 4 | 5 | 6 | 7 | 8 | 9 |
|---|---|---|---|---|---|---|---|---|---|
| Polypropylene (MFI 3) | | | 100 | | | | | | |
| Polypropylene (MFI 12) | 100 | | | 100 | | 100 | | 100 | |
| Polypropylene (MFI 25) | | 100 | | | 100 | | 100 | | 100 |
| Polyamide 66 | 5 | 5 | 12 | 12 | 12 | 16 | 16 | 16.5 | 15 |
| Glass fiber (Vetrotex) | 12 | 12 | 30 | 30 | 30 | 40 | 40 | 50 | 50 |
| Carbon black (EC 600) | 1 | 1 | 2 | 2 | 2 | 2.8 | 2.8 | 2.8 | 2.5 |
| Property | | | | | | | | | |
| Flexural Modulus, MPa | 3054 | 3037 | 4168 | 4684 | 4450 | 5812 | 5515 | 5576 | 6249 |
| Volume Resistivity, ohm-cm | $10^7$ | 2863 | 1100 | 850 | 290 | 565 | 405 | $2.3 \times 10^4$ | 543 |

Table 7 hereinbelow provides examples of compositions 10 including carbon fibers as also illustrated with reference to FIGS. 5A–5C hereinabove. Volume resistivity of less than 1 ohm-cm were achieved in carbon fibers/carbon black/glass fiber/second thermoplastic component (polyamide)/polypropylene compounds. Table 7 below illustrates non limiting carbon fibers containing compositions and their properties.

TABLE 7

| Composition | 1 | 2 | 3 | 4 | 5 | 6 | 7 | 8 | 9 | 10 |
|---|---|---|---|---|---|---|---|---|---|---|
| Polypropylene (MFI 25) | 100 | 100 | 100 | 100 | 100 | 100 | 100 | 100 | 100 | 100 |
| Polyamide 66 | 12 | 12 | 12 | 12 | 12 | 14 | 14 | 14 | 14 | 14 |
| Glass Fiber (Vetrotex) | 30 | 30 | 30 | 30 | 30 | 40 | 40 | 40 | 40 | 40 |
| Carbon Black (EC 600) | 2 | 2 | 2 | 2 | 2 | 2.8 | 2.8 | 2.8 | 2.8 | 2.8 |
| Carbon Fiber | 0 | 6 | 10 | 20 | 30 | 0 | 6 | 10 | 14 | 20 |
| Property | | | | | | | | | | |
| Flexural Modulus, MPa | 4850 | 6264 | 7910 | 9770 | 10514 | 5964 | 6675 | 8129 | 9641 | 10495 |
| Volume Resistivity, ohm-cm | 344 | 7.2 | 2 | 0.465 | 0.168 | 425 | 12.2 | 1.2 | 0.96 | 0.32 |

It will be appreciated that the compositions of the present invention, in particular the ones including carbon fibers and having a resistivity of less than 1 Ohm-cm provide improved Electro Magnetic Interference (EMI) shielding with a lower content of carbon black and carbon fibers. Therefore, they are superior to prior art electrically conductive plastics in a wide range of applications, such as clean room applications where the amount of carbon is important for the cleanliness of the process.

It will be appreciated that the present invention is not limited by what has been described hereinabove and that numerous modifications, all of which fall within the scope of the present invention, exist. For example, while the present invention has been described with reference to polypropylene, the present invention is equally applicable to other polyolefins such as polyethylene and to polyethylene-polypropylene mixtures. Polyethylene based compositions were prepared using LDPE and HDPE grades in a generally similar manner to that of polypropylene. As an example, a polyethylene based composition (100 parts on a similar weight basis) blended with 11 parts of polyamide (PA6), 20 parts of glass fibers and 4.4 parts of carbon black (EC-300) exhibit volume resistivity of $10^5$–$10^6$ ohm-cm.

Table 8 illustrates two further examples of polyethylene based compositions.

TABLE 8

| Composition | 1 | 2 |
|---|---|---|
| PE 800 (MFI 20) | 100 | |
| PE 600 (MFI 7) | | 100 |
| Polyamide 66 | 12 | 12 |
| Glass fiber (Vetrotex) | 30 | 30 |
| Carbon black (EC 600) | 2 | 2 |
| Property | | |
| Specific Gravity, Kg/dm$^3$ | 1.07 | 1.07 |
| Water Absorption, % | 0.06 | 0.06 |
| Flexural Modulus, MPa | 1663 | 1622 |
| Tensile Modulus, MPa | 746 | 678 |
| Tensile Strength, MPa | 19.3 | 17.1 |
| Elongation at Break, % | 3.0 | 3.3 |
| Izod Impact, notched, J/m | 80 | 81 |
| Melt Flow Rate, 275° C., 2.16 Kg | 33.2 | 18.8 |
| Heat Distortion Temp, ° C. | 96 | 96 |
| Volume Resistivity, ohm-cm | $1 \times 10^6$ | $2 \times 10^6$ |

In other alternative embodiments, the polyolefin component is replaced by another thermoplastic compound as the first component forming matrix 12. In four preferred embodiments, the first component forming matrix 12 was acrylonitrile/butadiene/styrene (ABS), polystyrene (PS), high impact polystyrene (HIPS) and polyphenyleneoxide/polystyrene (NORYL).

Table 9 illustrates two examples of polyethylene-polypropylene based compositions.

TABLE 9

| Composition | 1 | 2 |
|---|---|---|
| PE 800 (MFI 20) | 100 | |
| PE 600 (MFI 7) | | 100 |
| Polypropylene (MFI 25) | 24 | 24 |
| Polyamide 66 | 8 | 8 |
| Glass fiber (Vetrotex) | 20 | 20 |
| Carbon black (EC 600) | 1.5 | 1.5 |
| Property | | |
| Specific Gravity, Kg/dm$^3$ | 1.03 | 1.02 |
| Water Absorption, % | 0.05 | 0.05 |
| Flexural Modulus, MPa | 1975 | 2117 |
| Tensile Modulus, MPa | 1246 | 1176 |
| Tensile Strength, MPa | 27 | 27.4 |
| Elongation at Break, % | 2.3 | 2.5 |
| Izod Impact, notched, J/m | 68 | 70 |
| Melt Flow Rate, 275° C., 2.16 Kg | 24.7 | 14.2 |
| Heat Distortion Temp, ° C. | 101 | 102 |
| Volume Resistivity, ohm-cm | $3 \times 10^5$ | $3 \times 10^5$ |

Table 10 illustrates a nonlimiting example of compositions 10 formed with ABS, PS, HIPS and NORYL with different second thermoplastic component (different types of polyamide compositions, different glass fiber content and different low amounts (less than or equal to 3 phr) of carbon black.

TABLE 10

| Composition | 1 | 2 | 3 | 4 | 5 | 6 |
|---|---|---|---|---|---|---|
| ABS | 100 | 100 | 100 | | | |
| PS | | | | 100 | | |
| HIPS | | | | | 100 | |
| NORYL | | | | | | 100 |
| Polyamide 6 | | 12 | | | 12 | |
| Polyamide 12 | 8 | | 12 | 12 | | |
| Polyamide 66 | | | | | | 12 |
| Glass fiber (Vetrotex) | 20 | 30 | 30 | 30 | 30 | 30 |
| Carbon black (EC 600) | 1.2 | 3 | 3 | 2 | 3 | 3 |
| Property | | | | | | |
| Volume Resistivity, ohm-cm | $10^8$ | $10^4$ | $10^3$ | $10^5$ | $10^4$ | $10^3$ |

Tables 11, 12 and 13 provide further examples of PS, HIPS and Noryl based compositions, respectively, and their mechanical properties.

Table 11 illustrates the dependence of resistivity and physical properties on glass fiber concentration in a PS/PA/GF/CB compound.

TABLE 11

| Composition | 1 | 2 | 3 | 4 |
|---|---|---|---|---|
| PS (GP) | 100 | 100 | 100 | 100 |
| Polyamide 6 | 5 | 8 | 12 | |
| Polyamide 12 | | | | 12 |
| Glass fiber (Vetrotex) | 12 | 20 | 30 | 30 |
| Carbon black (EC 600) | 1.5 | 2 | 3 | 3 |
| Property | | | | |
| Specific Gravity, Kg/dm$^3$ | 1.09 | 1.17 | 1.22 | 1.2 |
| Water Absorption, % | 0.12 | 0.12 | 0.13 | 0.07 |
| Flexural Modulus, MPa | 4850 | 5830 | 7100 | 7000 |
| Tensile Modulus, MPa | 2740 | 3130 | 3650 | 3290 |
| Tensile Strength, MPa | 56 | 70 | 66 | 59 |
| Elongation at Break, % | 2 | 2 | 2 | 2 |
| Izod Impact, notched, J/m | 43 | 52 | 51 | 38 |
| Melt Flow Rate, 230° C., 2.16 Kg | 8.2 | 5.7 | 3.7 | 3.0 |
| Heat Distortion Temp, ° C. | 82 | 84 | — | 86 |
| Volume Resistivity, ohm-cm | $4.5 \times 10^5$ | $7.5 \times 10^4$ | $3.8 \times 10^4$ | $2.2 \times 10^4$ |

Table 12 illustrates the dependence of resistivity and physical properties on glass fiber concentration in HIPS/PA/GF/CB compound.

TABLE 12

| Composition | 1 | 2 | 3 | 4 |
|---|---|---|---|---|
| HIPS | 100 | 100 | 100 | 100 |
| Polyamide 6 | 5 | 8 | 12 | |
| Polyamide 12 | | | | 12 |
| Glass fiber (Vetrotex) | 12 | 20 | 30 | 30 |
| Carbon black (EC 600) | 1.5 | 2 | 3 | 3 |
| Property | | | | |
| Specific Gravity, Kg/dm$^3$ | 1.12 | 1.16 | 1.21 | 1.19 |
| Water Absorption, % | 0.13 | 0.14 | 0.14 | 0.07 |
| Flexural Modulus, MPa | 3600 | 4560 | 6410 | 6050 |
| Tensile Modulus, MPa | 1800 | 2050 | 2630 | 2050 |
| Tensile Strength, MPa | 43 | 51 | 61 | 46 |
| Elongation at Break, % | 2 | 2 | 2 | 2 |
| Izod Impact, notched, J/m | 46 | 46 | 47 | 34 |
| Melt Flow Rate, 230° C., 2.16 Kg | 2.3 | 1.7 | 1.9 | 1.7 |
| Heat Distortion Temp, ° C. | — | 97 | 92 | 93 |
| Volume Resistivity, ohm-cm | $9 \times 10^6$ | $7 \times 10^4$ | $7 \times 10^3$ | $1.5 \times 10^4$ |

Table 13 illustrates the dependence of resistivity and physical properties on glass fiber concentration in Noryl/PA66/GF/CB compound.

TABLE 13

| Composition | 1 | 2 |
|---|---|---|
| Noryl | 100 | 100 |
| Polyamide 66 | 12 | 16 |
| Glass fiber (Vetrotex) | 30 | 40 |
| Carbon black (EC 600) | 3 | 4 |
| Property | | |
| Specific Gravity, Kg/dm$^3$ | 1.24 | 1.28 |
| Water Absorption, % | 0.17 | 0.20 |
| Flexural Modulus, MPa | 6501 | 7193 |
| Tensile Modulus, MPa | 3382 | 4361 |
| Tensile Strength, MPa | 64.1 | 79.2 |
| Elongation at Break, % | 2.0 | 1.8 |
| Izod Impact, notched, J/m | 38 | 42 |
| Melt Flow Rate, 275° C., 2.16 Kg | 1.0 | 0.5 |
| Heat Distortion Temp, ° C. | 122 | 124 |
| Volume Resistivity, ohm-cm | $5 \times 10^5$ | $1.8 \times 10^4$ |

Table 14 illustrates compositions 10 wherein the second thermoplastic component is EVOH and not polyamide. The table illustrates the dependence of resistivity on glass fiber concentration in PP/EVOH/GF/CB compound.

TABLE 14

| Composition | 1 | 2 | 3 |
|---|---|---|---|
| Polypropylene (MFI 25) | 100 | 100 | 100 |
| EVOH | 8 | 10 | 12 |
| Glass fiber (Vetrotex) | 20 | 30 | 30 |
| Carbon black (EC 600) | 2 | 2.5 | 3 |
| Property | | | |
| Specific Gravity, Kg/dm$^3$ | 1.03 | 1.07 | 1.07 |
| Water Absorption, % | 0.03 | 0.03 | 0.05 |
| Flexural Modulus, MPa | 4530 | 5697 | 5529 |
| Tensile Modulus, MPa | 2475 | 2572 | 2670 |
| Tensile Strength, MPa | 59.7 | 62.1 | 61.8 |
| Elongation at Break, % | 2.7 | 2.5 | 2.4 |
| Izod Impact, notched, J/m | 69 | 66 | 58 |
| Melt Flow Rate, 230° C., 2.16 Kg | 5.0 | 4.5 | 3.2 |
| Heat Distortion Temp, ° C. | 160 | 160 | 160 |
| Volume Resistivity, ohm-cm | $1.7 \times 10^5$ | $1.6 \times 10^5$ | $1.2 \times 10^3$ |

Table 15 illustrates the dependence and resistivity and physical properties on glass fiber concentration in PP/PA/GF/CB (PP: Elastomer 60:40) compound containing elastomer. It is clearly shown that the compounds containing elastomer offer higher impact than the compounds summarized in Table 3B.

TABLE 15

| Composition | 1 | 2 | 3 | 4 |
|---|---|---|---|---|
| Polypropylene | 100 | 100 | 100 | 100 |
| Polyamide 66 | 5 | 8 | 8 | 10 |
| Glass fiber (Vetrotex) | 12 | 20 | 25 | 30 |
| Carbon black (EC600) | 1 | 1.5 | 1.5 | 2 |
| Property | | | | |
| Flexural Modulus, MPa | 1500 | 1900 | 2000 | 2300 |
| Izod Impact, notched, J/m | 134 | 120 | 107 | 100 |
| Surface Resistivity, ohm/sq. | $10^7$ | $10^6$ | $10^5$ | $10^5$ |

It will be appreciated by persons skilled in the art that the present invention is not limited to what has been particularly shown and described hereinabove. Rather, the scope of the present invention is defined only by the claims that follow:

We claim:

1. An electrically conductive composition comprising:
   a matrix comprising substantially a first thermoplastic component;
   a second thermoplastic component having a higher polarity than that of said first thermoplastic component, said second component encapsulating a plurality of fibers forming a network of encapsulated fibers within said matrix; and
   a carbon component preferentially attracted to said second component so as to make said network an electrically conductive network within said matrix, said carbon component located at the interface between said second thermoplastic component and said matrix wherein said carbon component is carbon black and is present in an amount less than 10 parts per hundred.

2. A composition according to claim 1 wherein said first thermoplastic component is a polyolefin compound with or without an added elastomer component.

3. A composition according to claim 2 wherein said polyolefin is selected from the group consisting of polypropylene and polyethylene.

4. A composition according to claim 3 wherein said polypropylene is a homopolymer or a copolymer.

5. A composition according to claim 1 wherein said second component is polyamide or EVOH.

6. A composition according to claim 5 wherein said composition comprises less than 20 parts per hundred polyamide or EVOH.

7. A composition according to claim 1 wherein said fibers are glass fibers.

8. A composition according to claim 7 wherein said composition comprises less than 55 parts per hundred glass fibers.

9. A composition according to claim 1 wherein said carbon component further carbon fibers.

10. A composition according to claim 1 wherein said carbon component is a mixture of carbon black and carbon fibers.

11. A composition according to claim 9 comprising less than 30 parts per hundred carbon fibers.

12. A composition according to claim 1 having a volume resistivity from about 0.1 to about $10^9$ ohm-cm.

13. A composition according to claim 1 having a flexural modulus of up to about 11,000 MPa.

14. A composition according to claim 1 having a tensile strength of up to 60 MPa.

15. A composition according to claim 1 wherein said first component is selected from acrylonitrile/butadiene/styrene, polystyrene, high impact polystyrene and polyphethyleneoxide/polystyrene.

16. A composition according to claim 15 wherein said second component is polyamide or EVOH.

17. A composition according to claim 2 wherein said elastomer component comprises a combination of elastomers.

18. A composition according to claim 17 wherein said combination of elastomers affect the mechanical properties of said composition without significantly affecting its electrical conductivity.

19. A method for producing an electrically conductive composition comprising the step of compounding a matrix comprising substantially a first thermoplastic component with a second thermoplastic component having a higher polarity than that of said first thermoplastic component, said second component encapsulating a plurality of fibers forming a network of encapsulate fibers within said matrix; and
   a carbon component preferably attracted to said second component so as to make said network an electrically conductive network within said matrix, said carbon component located at the interface between said second thermoplastic component and said matrix wherein said carbon component is carbon black and is present in an amount less than 10 parts per hundred.

20. A method according to claim 19 further comprising the step of forming said first thermoplastic component from a polyolefin compound with or without an added elastomer component.

21. A method according to claim 20 wherein said polyolefin is selected from the group consisting of polypropylene and polyethylene.

22. A composition according to claim 21 wherein said polypropylene is a homopolymer or a copolymer.

23. A composition according to claim 19 further comprising the step of forming said second thermoplastic component from polyamide or EVOH.

24. A method according to claim 23 wherein said composition comprises less than 20 parts per hundred polyamide.

25. A method according to claim 19 wherein said fibers are glass fibers.

26. A method according to claim 25 wherein said composition comprises less than 55 parts per hundred glass fibers.

27. A method according to claim 19 wherein said carbon component further carbon fibers.

28. A method according to claim 19 wherein said carbon component is a mixture of carbon black and carbon fibers.

29. A method according to claim 27 wherein said composition comprising less than 30 parts per hundred carbon fibers.

30. A method according to claim 19 wherein said composition has a volume resistivity from about 0.1 to about $10^9$ ohm-cm.

31. A method according to claim 19 wherein said composition has a flexural modulus of up to about 11,000 MPa.

32. A method according to claim 19 wherein said composition has a tensile strength of up to 60 MPa.

33. A method according to claim 19 comprising the step of forming said first component from acrylonitrite/butadiene/styrene, polystyrene, high impact polystyrene and polyphenyleneoxide/polystyrene.

34. A method according to claim 33 wherein said second component is polyamide or EVOH.

35. A method according to claim 19 wherein said elastomer component comprises a combination of elastomers.

36. A method according to claim 35 wherein said combination of elastomers affect the mechanical properties of said composition without significantly affecting its electrical conductivity.

* * * * *